(12) United States Patent
Hutchison et al.

(10) Patent No.: US 7,064,092 B2
(45) Date of Patent: Jun. 20, 2006

(54) WOVEN FACE POLYVINYL CHLORIDE FLOOR COVERING

(75) Inventors: Robert D. Hutchison, Daleville, VA (US); Todd M. Shail, Roanoke, VA (US)

(73) Assignee: Mohawk Brands, Inc., Wilmington, DE (US)

( * ) Notice: Subject to any disclaimer, the term of this patent is extended or adjusted under 35 U.S.C. 154(b) by 208 days.

(21) Appl. No.: 10/453,788

(22) Filed: Jun. 4, 2003

(65) Prior Publication Data

US 2004/0248489 A1 Dec. 9, 2004

(51) Int. Cl.
*B32B 27/12* (2006.01)
*B32B 27/30* (2006.01)

(52) U.S. Cl. ............. 442/187; 442/268; 442/286; 442/288; 442/348; 442/394; 442/396

(58) Field of Classification Search ............... 428/85; 442/181, 199, 118, 187, 268, 286, 288, 348, 442/394, 396
See application file for complete search history.

(56) References Cited

U.S. PATENT DOCUMENTS

| | | | |
|---|---|---|---|
| 3,779,857 A * | 12/1973 | Hadgraft et al. | 442/30 |
| 4,892,056 A | 1/1990 | Hawkes et al. | |
| 5,055,333 A * | 10/1991 | Heine et al. | 428/88 |
| 5,415,917 A | 5/1995 | Tesch | |
| 5,965,232 A * | 10/1999 | Vinod | 428/85 |
| 6,162,748 A | 12/2000 | Schilling et al. | |
| 6,306,318 B1 | 10/2001 | Ricciardelli et al. | |

FOREIGN PATENT DOCUMENTS

| | | |
|---|---|---|
| BR | 9200499 A | 5/1994 |
| GB | 1532161 | 11/1978 |
| WO | WO 99/19557 | 4/1999 |

OTHER PUBLICATIONS

Abstract of "Resilient Floor Coverings," Mar. 1983.
Abstract of PVC (Polyvinyl Chloride), Friedberg et al; Plast. Engng., 1978.
Abstract of "Survey of Carpet Backcoating Materials," Reiss, Carpets International Ltd., 1978.
Abstract of "How to Back Carpets with PVC," Renshaw et al; 1972.
Abstract of "Carpet Tiles: Which Backing?" Cheetham, Tufting Yearbook 93-94, 118 (1973).
Abstract of "Developments in Non-SBR Carpet Backing Processes," Carpet Dyer Intern. (Mar. 23, 1979).

(Continued)

*Primary Examiner*—Terrel Morris
*Assistant Examiner*—Jennifer Boyd
(74) *Attorney, Agent, or Firm*—Nixon & Vanderhye P.C.

(57) ABSTRACT

The floor covering includes multiple layers including a non-woven base layer, a VAE precoat applied to the non-woven woven base layer and overlaid by a first PVC layer. A fiberglass mat is applied over the first PVC layer and a second PVC layer is applied over the mat. A woven PVC layer is laminated by heat and pressure to the underlying second PVC layer. The woven PVC layer comprises monofilament or multifilament cores, preferably but not limited to, polyester filaments overlaid by a PVC coating.

14 Claims, 4 Drawing Sheets

OTHER PUBLICATIONS

Abstract of "Resurgence of Interest in Nonwoven Carpet Systems," Stoddard Holdings, Nonwovens Report International, 1988, No. 208, Jul., 1988.

Abstract of "Launch of Special Healthcare Carpet," ICB International Carpet Bulletin No. 234, (Oct. 1992).

Abstract of "The Technology of Carpet Tile Production," ICB International Carpet Bulletin No. 184 (Feb. 1987).

Abstract of "Backcoating Technology of Carpets," Smigielski, IWS Carpet Technical Information Letter No. 84, (Jul. 17, 1981).

Abstract of "DuPont Introduces SpillBlock Carpet Backing Technology," Gavin, Floor Covering Weekly 43 (Feb. 21, 1994).

Abstracts of "Carpets and the Environments," Kirby, Textile Asia 24, No. 1 (Jan. 1993).

Abstract of "The Twentieth Century: Quantum Leaps," Helm., Floor Focus 8, No. 10 (Dec. 1999).

Abstract of "Modular Carpet Backing: Is PVC Safe?," Goodman, Floor Covering Weekly No. 47 (Sep. 7, 1998).

Abstract of "Why Carpet Tile is a Hit with Specifiers," Textile World 149, No. 9 (Sep. 1999).

Abstract of "Coated Textiles," Reimers, BTRA International Conference on Recent Advances in Chemistry and Technology of Processing Cotton and Manmade Textiles (Feb. 1991).

* cited by examiner

WOVEN FACE POLYVINYL CHLORIDE FLOOR COVERING

BACKGROUND OF THE INVENTION

The present invention relates to a floor or wall covering in tile or roll form and particularly relates to a woven face PVC floor covering.

A principal and inherent deficiency in carpets, particularly in commercial facilities, resides in the declining appearance retention of the aesthetic features of the carpet over long periods of use. It will also be appreciated that carpet construction fabricated to commercial requirements frequently and typically sacrifices other desirable attributes of carpets or rugs such as comfort underfoot. Another prime concern in the selection of materials for use in commercial carpeting is the capacity of the materials to be recycled. Currently, carpet being replaced is conventionally transported to landfills which are themselves becoming increasingly scarce and very little, if any, of the taken-up or used carpet is recycled.

Further, many of today's commercial carpets have limited strength characteristics. For example, many commercial carpets over time, or upon impact by certain objects, will delaminate, essentially requiring replacement of the carpet. Other characteristics of many commercial carpets also leave much to be desired. For example, many commercial carpets are formed of polyurethane, which is only moisture-resistant and thus can and do degrade over time. Moreover, in many commercial carpet constructions, trimming of sprouts of fiber is common. This escalates the time required for initial carpet installation and, hence, costs, as well as often requiring removal of fibers which come loose over time.

BRIEF DESCRIPTION OF THE INVENTION

In accordance with a preferred embodiment of the present invention, there is provided, in one aspect, a modular carpet, e.g., carpet tiles or roll carpet in discrete widths such as six-foot widths, wherein the wear surface of the covering is composed of a material woven with yarns covered with polyvinyl chloride. For example, the face covering may comprise yarns consisting of a core of monofilament or PVB or organic polymer plastic staple polyester coated with PVC. However, it will be appreciated that while a polyester core is preferred, any similar core yarn would be suitable, e.g., nylon, wool, acrylic, cotton, modacrylic, PLA or other synthetic or natural yarns. Also and advantageously, the PVC can be colored in any number of different shades, affording a wide variety of designs, and may be woven in conventional weaving machines into a fabric.

Preferably, the carpeting comprises successive layers of various materials. The base of the carpeting, i.e., the side of the carpeting opposite the face side and in contact with the underlying floor, is preferably formed of a non-woven material. A layer of VAE pre-coat is applied to the non-woven material and dried and cured. A first layer of PVC is then applied on top of the VAE layer, followed by a fiberglass mat on top of the first PVC layer. A second layer of PVC is then applied over the fiberglass mat and the PVC is then cured by conventional methods. Finally, the woven PVC material is laminated to the underlying layers as it exits the curing oven. With an embossing roll and the heat of the cured PVC, the two layers of PVC bond to form the final product. The heat and pressure at the embossing station also causes at least portions of the PVC surrounding the fibers of the woven face layer to coalesce with and bond to the underlying PVC layers to form a unitary structure. Consequently, the final carpet is highly stable and has high strength, as well as high resistance to delamination.

By utilizing the foregoing described materials, approximately 80% of the carpet is recyclable. Conversely, by using post-consumer/industrial materials available on the market, approximately 80% of the final carpet may be constructed from those post-consumer/industrial waste sources. Moreover, because of the use of PVC, the carpet is 100% impermeable to moisture and, hence, will not degrade over time with moisture. By using a yarn consisting of a core monofilament PET yarn with PVC extruded about the yarn, post-installation trimming of sprouts of fibers is entirely eliminated, with consequent reduced labor and costs upon installation and elimination of unsightly loose yarns over time. Many other desirable characteristics of the carpet include resistance to staining, abrasion, fastness and resistance to soiling. It will also be appreciated that the carpet can be provided in roll form, for example, in widths much larger than standard widths, i.e., may be provided in widths 6-feet wide, enabling easy and less costly installation due to fewer seams and improving the aesthetics as a result of the fewer seams. Because the carpet is fabricated in larger widths, it is also capable of being manufactured in larger tiles than conventional tiles, for example, on the order of 18 and 24-inch wide tiles.

In a preferred embodiment according to the present invention, there is provided a floor or wall covering comprising a base layer, a VAE pre-coat applied to the base layer, a first PVC layer overlying the VAE pre-coat layer, a non-woven mat overlying the first PVC layer, a second PVC layer overlying the mat and a woven PVC layer overlying the second PVC layer and forming a face layer for the covering.

In a further preferred embodiment according to the present invention, there is provided a floor or wall covering comprising a base layer, a first PVC layer overlying the base layer, a non-woven mat overlying the first PVC layer, a second PVC layer overlying the mat and a woven layer overlying the second PVC layer and forming a face layer for the covering, said woven layer including yarns having at least one polyester filament coated with PVC.

DETAILED DESCRIPTION OF THE INVENTION

Figure 1:
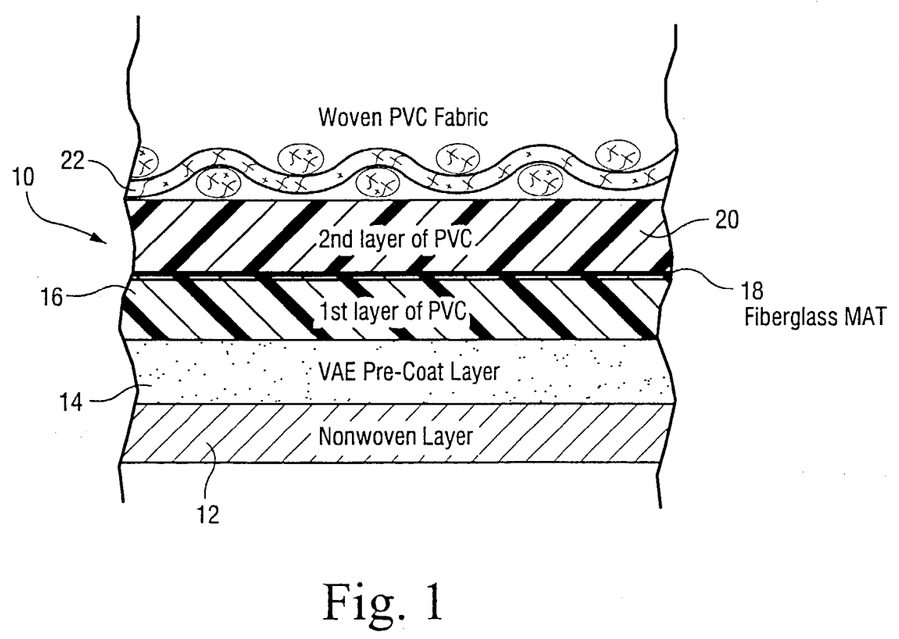
FIG. 1 is a fragmentary cross-sectional view of a covering constructed according with a preferred embodiment of the present invention.

Referring now to the drawings, particularly to FIG. 1, there is illustrated a covering, generally designated 10, constructed in accordance with a preferred embodiment of the present invention. Covering 10 is comprised of successive layers in the following order from a base layer to a face layer. The initial or base layer 12 is preferably formed of a non-woven material, although it will be appreciated that layer 12 may comprise a woven material, a tufted carpet or any other textile or substrate sufficiently rigorous in construction to be suitable. The non-woven layer 12 may be formed of any one of non-woven materials such as polypropylene, nylon and polyester and preferably is formed of post-consumer recycled polyester. This material is preferably provided at about 4–40 oz/yd² weight and more preferably in a range of 8–12 oz/yd². The next layer 14 is preferably a pre-coat layer of various organic polymers including acrylic, SBR, EVA or preferably VAE applied to the non-woven material 12. Precoat layer 14 is particularly useful as it aids in passing various flammability and smoke tests required for most commercial carpets. If, however, those considerations are not a concern, the precoat layer 14 can be omitted. Preferably, the VAE pre-coat is applied to obtain about 4–40 and preferably 24 oz/yd² and then dried and cured. The third layer 16 comprises a first layer of PVC applied on top of the VAE layer. The PVC is preferably applied at a rate to provide about 10–80 and preferably about 45.5 oz/yd². A fiberglass mat layer 18 may or may not then be applied on top of the first layer 16 of PVC. The fiberglass mat may also be a Leno weave fiberglass material. Further, the fiberglass mat is either a non-woven or woven material and is applied at about 0.5–8.0 and preferably about 2 oz/yd². Applied on top of the fiberglass mat layer 18 when used is a second layer 20 of PVC. That is, the initial PVC layer for some applications may be sufficient. This second layer of PVC is applied at approximately 10–80 and preferably 45.5 oz/yd², similarly as the first layer 16 of the PVC. The PVC is then cured via conventional methods. Finally, the uppermost or face layer 22 is formed of a woven material laminated to the underlying layers as they exit the curing oven. With heat and pressure applied by an embossing roll 28 and the heat of the cured PVC, respectively, the two layers of PVC bond to one another and to the undersurface of the woven face layer. It will be appreciated that materials other than PVC may be used to bond the layers of the product together. For example, such materials may include PVB, TPOs, APOs, EVA, TPUs (thermal polyurethane), hydrocarbon resins and other organic polymer polyethylenes. However, the introduction of these latter materials alters undesirably the recyclable percentages of the finished product.

Figure 2A:
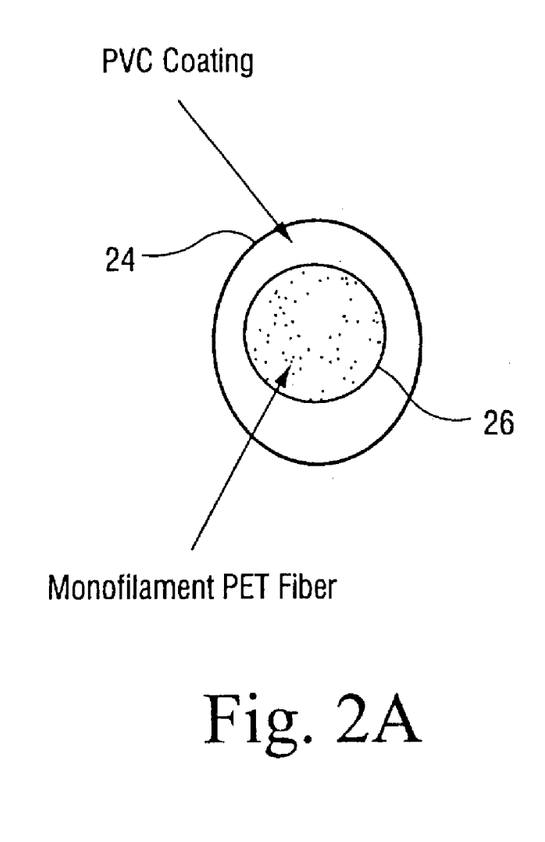
FIGS. 2A and 2B are enlarged cross-sectional views of respective yarns useful in forming the covering hereof.
Figure 2B:
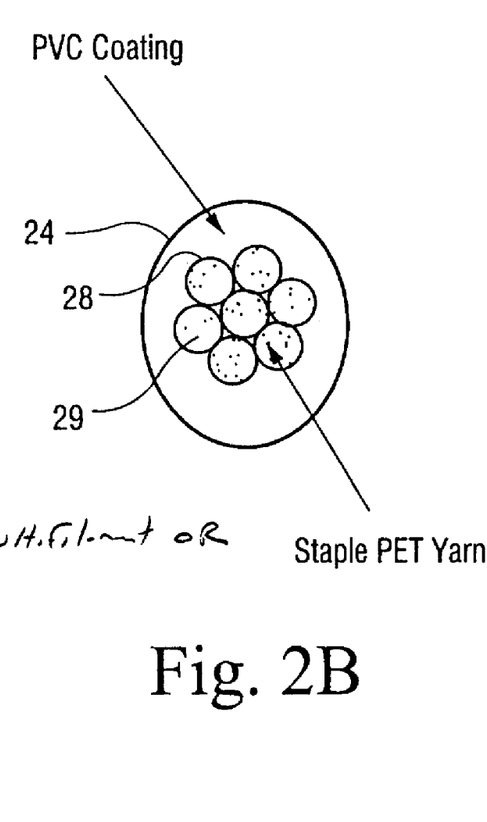

As illustrated in FIGS. 2A and 2B, the woven face layer 22 is comprised of yarns 24 that consist of a core monofilament or multifilament polyester coated with PVC or other thermoplastic polymers. Thus, in FIG. 2A, there is illustrated a core monofilament 26 surrounded by a coating of PVC material. In FIG. 2B, there is illustrated a multifilament or staple PET yarn core 28 comprising multiple filaments 29, each comprising a core black monofilament PET fiber. It will be appreciated, however, that the cores are not limited to polyester, but may include nylon, wool, acrylic, cotton, modacrylic, PLA or other synthetic or natural yarns. Moreover, the PVC can advantageously be colored in any number of shades to provide a particular aesthetic design. Further, the yarns may be woven by conventional weaving machines, preferably Dobby or Jacquard machines, to form the fabric.

Figure 3:
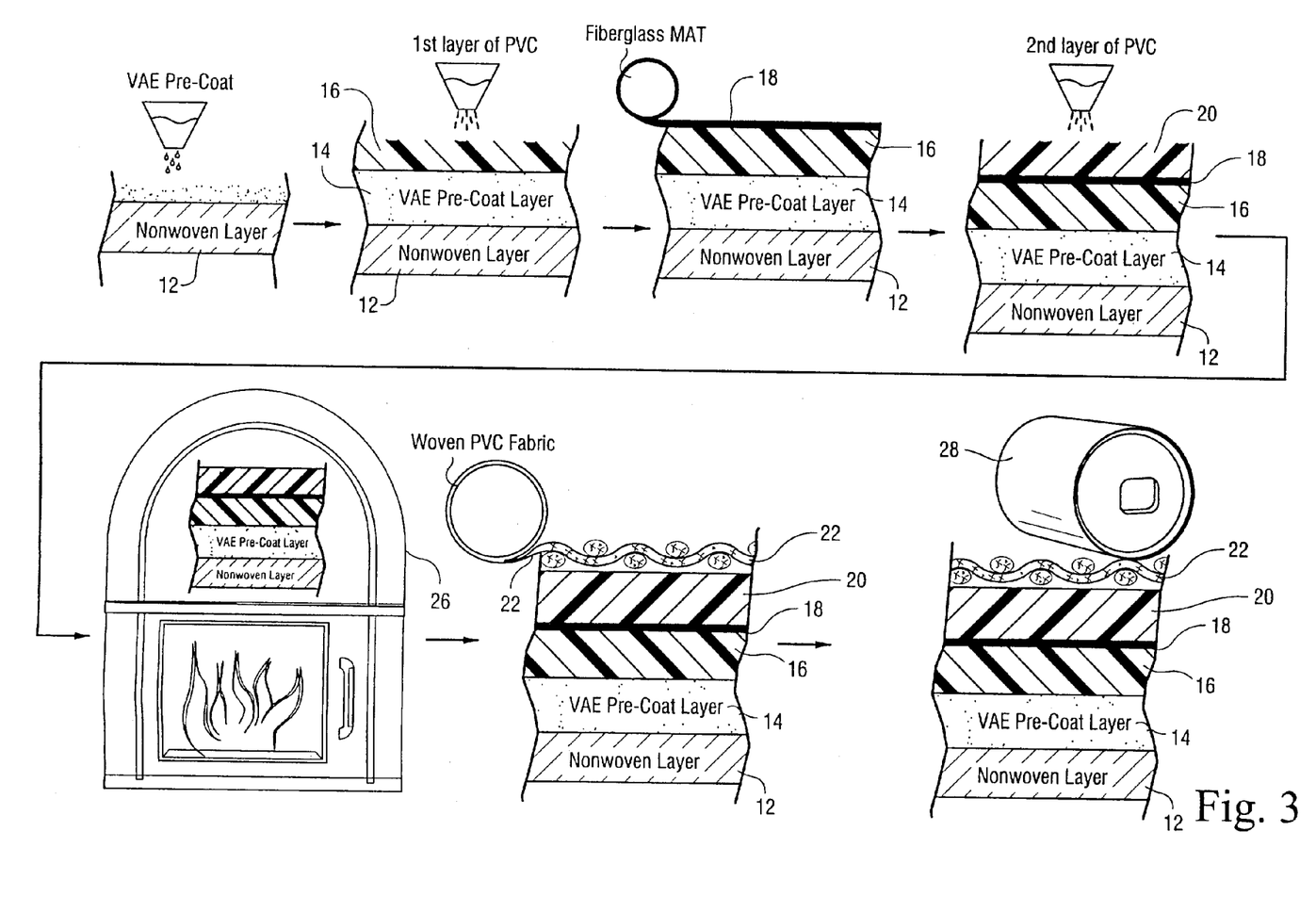
FIG. 3 is a series of fragmentary cross-sectional views illustrating a method of forming the covering hereof.

Referring now to FIG. 3, there is illustrated a method of fabricating a covering in accordance with a preferred embodiment of the present invention. First, the non-woven layer 12 is provided with a VAE coat. The VAE coating may be provided in liquid form and dried and cured on the underlying non-woven layer 12. The pre-coat 14, preferably VAE, is applied at the above-identified rate. Next, the third layer 16, preferably a PVC layer, is applied on top of the VAE pre-coated layer 14. The PVC layer is applied at the above-identified rate. The mat layer 18, preferably formed of fiberglass material is then applied over the PVC layer 16 and the second layer 18 of PVC is then applied over the mat. The substrate is then passed through an oven 26 where the PVC is cured via conventional methods. Upon emerging from the oven 26, the face layer 22 of the woven PVC is applied to the final layer 20 of PVC. The woven face layer is preferably laminated to the substrate as it exits the curing oven. By applying an embossing roll 28 and utilizing the heat of the cured PVC, the two layers 16 and 20 of PVC bond to form the final product. Additionally, the heat and pressure at the embossing station causes the PVC of the first and second layers, as well as the PVC surrounding the fibers on the underside of the woven face layer, to coalesce with each other to form a unitary structure. Consequently, the final product has substantial resistance to delamination.

Figure 4:
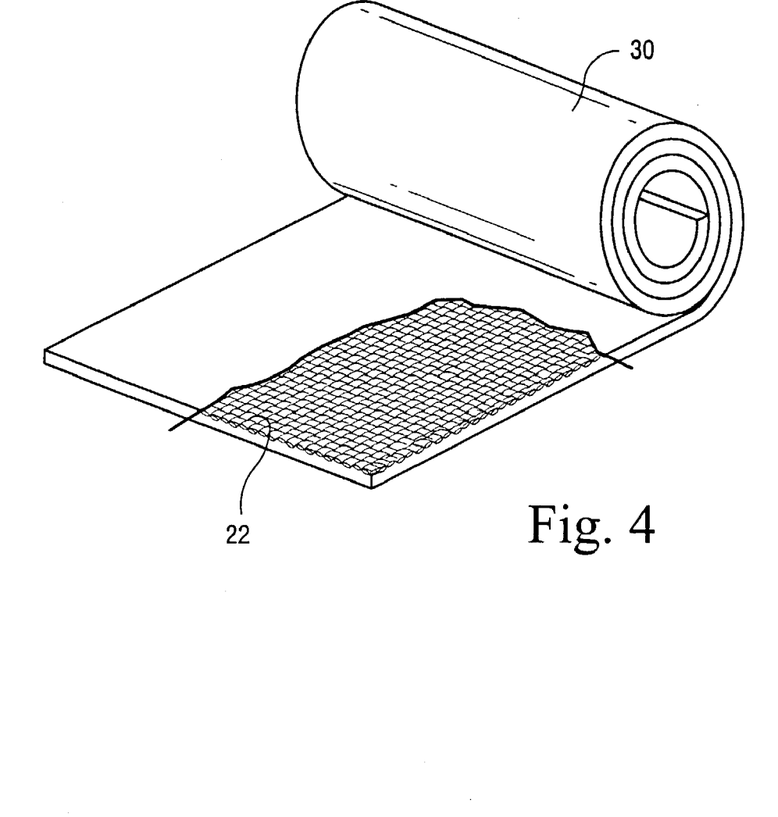
FIG. 4 is a schematic illustration of a covering according to the present invention in roll form.
Figure 5:
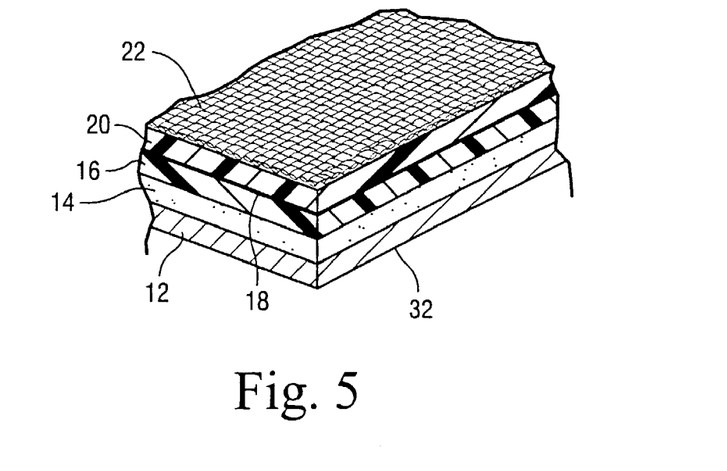
FIG. 5 is a schematic representation of the covering hereof in tile form.

Referring to FIGS. 4 and 5, the covering 10 may be provided in different forms. For example, in FIG. 4, the covering is provided in roll form 30, e.g., six feet in width. This enables an easier and less costly installation due to fewer seams. It will be appreciated that fewer seams also visually improve the aesthetics of the final installation. By fabricating the covering in greater widths, i.e., six feet, it is also possible to manufacture tiles in 18 and 24-inch widths, which affords greater selection in tile dimensions, in comparison with prior art tiles, which are conventionally formed in 18-inch widths. A fragmentary perspective view of the materials forming the covering 10 in the form of a tile 32 is illustrated in FIG. 5.

The materials employed in the fabrication of the covering 10 enable approximately 80% of the final product to be recyclable. Conversely, by using post-consumer/industrial materials of a similar nature and available on the market, the covering may be constructed from approximately 80% of those post-consumer/industrial waste sources. In comparative testing with prior coverings, it has been found that the present covering will not delaminate using standard ASTM testing, whereas prior art coverings do delaminate. Also, the breaking strength of the present covering, again tested by standard ASTM testing, has approximately twice or greater the strength as compared with the prior coverings. It will also be appreciated that the covering is 100% impermeable to moisture as it is constructed substantially entirely of PVC materials. Additionally, with the PVC extruded about the polyester filament cores, the prior necessity for post-installation trimming of sprouts of fiber as common with prior art coverings is entirely eliminated. Moreover, the coalescence of PVC along at least the undersurface of the face layer with the underlying PVC enhances the elimination of loose fibers at the seams. Other characteristics of the covering, such as staining, abrasion and soil resistance, as well as fastness, provide a superior covering to those of prior art.

The floor covering described above has been exhaustively tested at an independent laboratory for various characteristics, as follows:

Flooring Radiant Panel Test

Specimens Nos. 1–3 of the covering described above were prepared and tested in accordance with ASTM E 64899 and/or Federal Test Method 372. NFPA 253.

| Test Results | Specimen No. 1 | Specimen No. 2 | Specimen No. 3 |
| --- | --- | --- | --- |
| Critical Radiant Flux | .74 watts/cm² | .51 watts/cm² | .69 watts/cm² |
| Total Burn Length | 28.0 cm | 39.0 cm | 30.0 cm |

-continued

| Test Results | Specimen No. 1 | Specimen No. 2 | Specimen No. 3 |
|---|---|---|---|
| Flame Front Out | 19.0 minutes | 30.0 minutes | 13.0 minutes |
| Average critical radiant flux .65 watts/cm$^2$ | | | |

Smoke Density Test (NIST)

Specimens Nos. 1–3 were prepared and tested in accordance with procedures proposed by the National Institute of Standards and Technology (formerly National Bureau of Standards). Technical Note 708 and NFPA 258, ASTM E 662-97

| Operating Conditions | | | | |
|---|---|---|---|---|
| Irradiance: | 2.5 watts/cm$^2$ | | G Factor | 132 |
| Thermal Exposure: | Non-flaming | | | |
| Furnace Voltage: | 104 | | | |

| Test Results | #1 | #2 | #3 | Average |
|---|---|---|---|---|
| Chamber Temperature, ° F. (start) | 95 | 95 | 95 | |
| Chamber Pressure | Maintained positive, under 3" H$_2$O | | | |
| Minimum Transmittance (TM), % | 1% | 1% | 2% | |
| at, minutes | 13.00 | 16.00 | 16.00 | 15.00 |
| Maximum Specific Optical Density (DM) | 924 | 924 | 885 | 911 |
| Clear Beam (DC) | 55 | 82 | 75 | 71 |
| DM, CORRECTED (DMC) | 869 | 842 | 810 | 840 |
| Specific Optical Density at 1.5 minutes | 2 | 1 | 2 | 2 |
| Specific Optical Density at 4.0 minutes | 113 | 117 | 132 | 121 |
| Time to 90% DM, minutes | 10.40 | 12.00 | 12.00 | 11.47 |
| Time to DS = 16, minutes | 2.50 | 2.40 | 2.20 | 2.37 |

Smoke Density Test (NIST)

Specimens of the submitted sample were prepared and tested in accordance with the procedures proposed by the National Institute of Standards and Technology (formerly National Bureau of Standards, Technical Note 708 and NFPA 258, ASTM E 662-97.

| Operating Conditions | | | | |
|---|---|---|---|---|
| Irradiance: | 2.5 watts/cm$^2$ | | G Factor | 132 |
| Thermal Exposure: | Flaming | | | |
| Furnace Voltage: | 102 | | | |
| Burner Fuel: | Propane | | | |

| Test Results | #1 | #2 | #3 | Average |
|---|---|---|---|---|
| Chamber Temperature, ° F. (start) | 95 | 95 | 95 | |
| Chamber Pressure | Maintained positive, under 3" H$_2$O | | | |
| Minimum Transmittance (TM), % | 14% | 22% | 12% | |
| at, minutes | 14.20 | 10.20 | 13.00 | 12.47 |
| Maximum Specific Optical Density (DM) | 509 | 747 | 518 | 591 |
| Clear Beam (DC) | 31 | 26 | 35 | 31 |
| DM, CORRECTED (DMC) | 478 | 721 | 485 | 561 |
| Specific Optical Density at 1.5 minutes | 172 | 132 | 145 | 150 |
| Specific Optical Density at 4.0 minutes | 311 | 405 | 315 | 344 |
| Time to 90% DM, minutes | 10.20 | 7.40 | 10.40 | 9.33 |
| Time to DS = 16, minutes | 0.80 | 0.90 | 0.90 | 0.87 |

Foot Traffic Cycles

Test Method Conducted

ASTM D 6119 Practice for Creating Surface Appearance Changes in Pile Yarn Floor Covering From Foot Traffic CRI TM-100 Creating Surface Appearance Changes in Pile Yarn Floor Covering From Foot Traffic CRI TM-101 Assessment of Carpet Surface Appearance Change Using the CRI Reference Scales Scope This practice covers the trafficking of pile yarn floor coverings in a laboratory in order to effect a change in surface appearance as a result of exposure to foot traffic under controlled conditions. A separate test method covers the assessment of surface appearance change using the CRI Reference Scales

| Specimen ID | Foot Traffic Cycles | Rating Length | Rating Width |
|---|---|---|---|
| Sample described above | 20,000 | 5.0 | 5.0 |
| | Average | 5.0 | |

Key to Ratings
5 Negligible or no change
4 Slight Change
3 Moderate Change
2 Considerable Change
1 Severe Change Hexapod Test Test Method Conducted ASTM D-5252 Hexapod Drum Tester ISO/TR 10361 Hexapod Tumbler Ratings Based on CRI TM-101 Photographic Scales Apparatus: Wire Instrumentation Hexapod Tumbler Carpet Tester Procedure The test specimen described above was subjected to the reported cycles of "Hexapod" tumbling, removing the specimen every 2,000 cycles for restoration by vacuuming.

An Electrolux upright vacuum cleaner (Discovery II) was used, making four (4) forward and backward passes along the length of the specimen.

The samples were assessed using daylight equivalent vertical lighting (1500 lux). Samples were viewed at an angle of 45 degrees from 1½ meter distance, judging from all directions.

The samples were also measured for pile height before and after testing to obtain a pile height retention value.

| NUMBER OF HEXAPOD SAMPLES | OVERALL APPEARANCE CHANGE | COLOR CHANGE | PILE HEIGHT RETENTION |
|---|---|---|---|
| 4,000 | 5 | 5 | N/A |
| 12,000 | 5 | 5 | N/A |

Key to Ratings
5 = Negligible or no change
4 = Slight change
3 = Moderate change
2 = Considerable change
1 = Severe change Abrasion Test Method Conducted ASTM D 3884 Abrasion Wheels—H-18 with 1000 grams load Procedure The sample was abraded until the primary backing was visible which is considered the "End Point."

Wear Cycles for sample of 1500.

AACHEN Dimensional Stability

Test Method Conducted

ITTS 004 AACHEN Dimensional Stability

Purpose and Scope

This test procedure measures the dimensional stability of textile floor coverings both modular and broadloom when subjected to varied moisture, heat and dry conditions. The test specimen corresponded to the preferred embodiment of the covering disclosed above.

| Test Condition | Measurement | Percent Change |
|---|---|---|
| $M_0$ | 18.0025" | |
| $MT_1$ | 18.0000" | −0.014 |
| $MT_2$ | 18.0088" | +0.035 |
| $MT_3$ | 17.9825" | −0.111 |
| $MT_4$ | 17.9938" | −0.049 |
| | | −0.0087" |
| $C_0$ | 17.9875" | |
| $CT_1$ | 17.9825" | −0.028 |
| $CT_2$ | 17.9900" | +0.014 |
| $CT_3$ | 17.9725" | −0.083 |
| $CT_4$ | 17.9725" | −0.083 |

Test Condition Key
$M_0$ Machine Direction Original Measurement
$C_0$ Cross Direction Original Measurement
$T_1$ Two (2) hours in an oven at 60° C.
$T_2$ Two (2) hours in a 1% solution at 20° C.
$T_3$ Twenty-four (24) hours in an oven at 60° C.
$T_4$ Forty-eight (48) hours in standard climate at 21° C. & 65% RH ASTM F 137 Flexibility A test specimen as described above was placed over a mandrel with the wearing surface face out. At the completion of the bending operation, visual examination was made for breaks, cracks, or other damage. The sample passed.

Delamination

Test Method Conducted

ASTM D 3936 Delamination Strength of Secondary Backing of Pile Floor Coverings

Scope

This method determined the delamination strength of secondary backing adhered to the finished pile floor covering of the test specimen described above. No separation was detected.

Breaking Strength

Test Method Conducted

ASTM D 1667 Breaking Strength

The sample tested corresponded to the preferred embodiment described above.

| Test Results | |
|---|---|
| Results Length (lbs.) | Results Width (lbs.) |
| 500.128 | 500.044 |
| 500.172 | 499.700 |
| 500.064 | 500.023 |
| 500.130 | 500.013 |
| 200.044 | 500.014 |
| 500.108 | 499.959 |

Resistance to Chemicals

Test Method Conducted

ASTM F 925 Standard Test Method for Resistance to Chemicals of Resilient Sheet Flooring The sample tested corresponded to the preferred embodiment described above.

Scope

This method provides a procedure for determining the resistance of resilient sheet vinyl floor covering to surface deterioration when exposed to various chemicals. This test method is not intended as a staining test. Categories for rating are surface dulling, surface attack and color change.

| Chemical Test Agent | Immediate Rating | 24 Hour Rating |
|---|---|---|
| White Vinegar | — | No Change |
| Rubbing Alcohol | — | No Change |
| White Mineral Oil | — | No Change |
| Sodium Hydroxide Solution | — | No Change |
| Hydrochloric Acid Solution | — | No Change |
| Household Ammonia Solution | — | No Change |
| Household Bleach Solution | — | No Change |

-continued

| Chemical Test Agent | Immediate Rating | 24 Hour Rating |
|---|---|---|
| Disinfectant | — | No Change |
| Unleaded Gasoline | — | No Change |

Key to Rating
No change
Slight change
Moderate change
Severe change

Stain Resistance

Test Method Conducted

AATCC Test Method 175 Stain Resistance

Procedure

The test sample(s) described above were subjected to staining in accordance to the test procedure. The evaluations are reported below, staining scale members indicate 10 being no apparent stain and 1 being a very severe stain.

Test Results: Rating

10

Accelerated Soiling

Test Method Conducted

ASTM D 6540 Standard Test Method for Accelerated Soiling of Pile Yarn Floor Covering Purpose and Scope This test method describes the equipment, and the test method for assessing the propensity of pile yarn floor coverings to early soiling using a standard artificial soil composition.

Purpose

The above-identified covering specimens were secured to a backing sheet mounted inside a Hexapod drum with the pile surface exposed, and were subjected to an accelerated soiling process. The degree of soiling was measured or assessed by comparing the change in color between soiled and original pile yarn floor covering, using a measurement device or visually using AATCC Gray Scales.

| Test Results | Sample Rating |
|---|---|
| Rating after soiling/before cleaning | 4 |
| Rating after soiling/after cleaning** | 5 |

*Type of soil used: AATCC 123
**Type of cleaning used: Hot Water Extraction
Key to Ratings
5 Negligible or no change
4 Slight change
3 Noticeable change
2 Considerable change
1 Severe change Electrostatic Propensity Test Method Conducted AATCC 134-1996 Electrostatic Propensity of Carpets Purpose and Scope This test method is designed to assess the static generating propensity of carpets developed when a person walks across them by controlled laboratory simulation of conditions which may be met in practice, and more particularly, with respect to those conditions which are known from experience to be strongly contributory to excessive accumulation of static charges. The specimen used corresponds to the preferred embodiment identified above.

Test Conditions:
Chamber Temperature: 70° F.
Chamber Relative Humidity: 20%

| Test Results | Sole | Under-lay | Maximum Voltage 1 (kV) | Maximum Voltage 2 (kV) | Averages (kV) |
|---|---|---|---|---|---|
| Test I Step Test | Neolite | Plate | Neg. 1.8 | Neg. 1.5 | Neg. 1.7 |
| Test II Step Test | Neolite | Plate | Pos. 1.9 | Pos. 1.9 | Pos. 1.9 |
| Test III Step Test | Leather | Plate | Pos. 0.1 | — | — |
| Test IV Scuff Test | Leather | Plate | Pos. 1.0 | — | — |

Soles:
a) Neolite XS 664
b) Suede Leather
Underlayment:
a) Plate: Earth grounded metal plate
b) H/J: Standard 40 oz/yd2 rubberized Hair/Jute cushion Static Coefficient of Friction Test Method Conducted ASTM C-1028 Static Coefficient of Friction Test Method Summary The above-identified specimen submitted was subjected to testing in accordance to the test procedure. The results are reported below:

| Test Results | | | |
|---|---|---|---|
| Dry Coefficient of Friction | | Wet Coefficient of Friction | |
| 1) | 0.80 | 1) | 0.71 |
| 2) | 0.80 | 2) | 0.76 |
| 3) | 0.78 | 3) | 0.78 |
| 4) | 0.82 | 4) | 0.71 |
| 5) | 0.81 | 5) | 0.78 |
| 6) | 0.81 | 6) | 0.76 |
| 7) | 0.82 | 7) | 0.74 |
| 8) | 0.80 | 8) | 0.78 |
| 9) | 0.83 | 9) | 0.79 |
| 10) | 0.83 | 10) | 0.76 |

-continued

Test Results

| Dry Coefficient of Friction | Wet Coefficient of Friction |
|---|---|
| 11) 0.80 | 11) 0.76 |
| 12) 0.82 | 12) 0.74 |
| Average 0.8108 | Average: 0.7548 |
| $F_D = (R_D/N_W) = X_D$ | $F_W = R_W/N_W) + X_W$ |

$F_D$ = static coefficient of friction for dry surface
$F_W$ = static coefficient of friction of wet surface
$R_D$ = total of the 12 dry force readings (lbs.)
$R_W$ = total of the 12 wet force readings (lbs.)
N = number of pulls (12)
$X_D$ = dry calibration factor
$X_W$ = wet calibration factor
W = total weight of the heel assembly plus 50 lb. weight Roll Chair Testing

Test Method Conducted

ITTS-205 Roll Chair Testing

Purpose and Scope

This test method is designed to measure the appearance retention of carpet when exposed to roll chair (office chair) exposure.

Procedure

A specimen of the above sample was installed on a wood substrate and exposed to the reciprocating action of an office chair, loaded with 150 pounds, impelled at approximately 14 cycles per minute. The specimen was exposed to the indicated number of cycles and rated in accordance to the scale below.

| Rating | Appearance of Carpet in Caster Traffic Region |
|---|---|
| 5 - Excellent | Negligible or no change |
| 4 - Good | Slight change in appearance, due more to disturbance of the pile than to matting. Visible change |
| 3 - Fair | Noticeable change in appearance. Some matting of the pile |
| 2 - Poor | Considerable change in appearance. Pile yarns either disturbed or packed and matted |
| 1 - Very Poor | Severe change in appearance. Pile yarns packed with severe crushing |

| Comments | Number of Cycles | Rating |
|---|---|---|
| | 10,000 | 4.5 |

Heat Aging

Test Method Conducted Heat Aging

Procedure

The covering described above was subjected to heat aging at 158° F. for fourteen (14) days. After the aging time, a visual assessment was made as to the discoloration and brittleness of the test specimen both front and back.

Test Results: No brittleness or discoloration of face or back

Colorfastness to Light

Test Method Conducted

AATCC Test Method 16 Option E Colorfastness to Light (Water-Cooled Xenon Arc)

Purpose and Scope

This test method provides the general principles and procedures which are currently in use for determining the colorfastness, to light of textile materials.

Procedure

Samples of the above-identified covering to be tested and the agreed-upon comparison standard(s) are exposed simultaneously to a light source under specified conditions. The colorfastness to light of the specimen is evaluated by comparison of the color change of the exposed portion to the masked or control portion of the test specimen using the AATCC Gray Scale for Color Change or by instrumental color measurement.

| Test Specimen Indication | Number of Cycles | Rating |
|---|---|---|
| See Above | 2 (40 AFU's) | 5 |

Key to Ratings

5 Negligible or no change
4 Slight change
3 Noticeable change
2 Considerable change
1 Severe change Colorfastness To Ozone Under High Humidities

Test Method Conducted

AATCC Test Method 129 Colorfastness to Ozone Under High Humidities

Purpose and Scope

This test method is used for determining the resistance of the color of textiles to the action of ozone in the atmosphere at elevated temperatures with relative humidities above 85%.

Procedure

A test specimen corresponding to the above-identified preferred embodiment and a swatch of control sample were simultaneously exposed to ozone in an atmosphere which is maintained at 87.5±2.5% relative humidity and a temperature of 40±1 C. (104±2 F.) until the control sample showed a color change corresponding to that of a standard of fading. The cycles were repeated until the specimen showed a definite color change or for a prescribed number of cycles.

| Test Specimen Indication | Number of Cycles | Rating |
|---|---|---|
| See Above | 2 | 5 |

Key to Ratings
5 Negligible or no change
4 Slight change
3 Noticeable change
2 Considerable change
1 Severe change Colorfastness To Burnt Gas Fumes Test Method Conducted AATCC Test Method 23 Colorfastness to Burnt Gas Fumes Purpose and Scope This test method is intended for assessing the resistance of the color of textiles of all kinds and in all forms when exposed to atmospheric oxides of nitrogen as derived from the combustion of natural gas.

Procedure

A specimen of the above-identified covering and the test control fabric were exposed simultaneously to oxides of nitrogen from burnt gas fumes until the control showed a change in color corresponding to that of the standard of fading. The change in color of the specimen was assessed with the standard gray scale for assessing change in color.

| Test Specimen Indication | Number of Cycles | Rating |
|---|---|---|
| See Above | 3 | 5 |

Key to Ratings
5 Negligible or no change
4 Slight change
3 Noticeable change
2 Considerable change
1 Severe change While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A floor or wall covering comprising:
   a non-woven polyester base layer;
   a vinyl acetate emulsion pre-coat applied to the base layer;
   a first polyvinyl chloride layer overlying and in contact with the vinyl acetate emulsion pre-coat layer;
   a non-woven mat overlying and in contact with the first polyvinyl chloride layer;
   a second polyvinyl chloride layer overlying and in contact with the mat; and
   a prestabilized woven polyvinyl chloride layer overlying and in contact with the second polyvinyl chloride layer and forming a face layer for the covering.

2. A covering according to claim 1 wherein said mat is formed of fiberglass.

3. A covering according to claim 1 wherein the first and second polyvinyl chloride layers are bonded to one another.

4. A covering according to claim 1 wherein the first and second polyvinyl chloride layers are integrally bonded to one another.

5. A covering according to claim 1 wherein the woven polyvinyl chloride layer is bonded to said second polyvinyl chloride layer.

6. A covering according to claim 1 wherein the woven polyvinyl chloride layer includes yarns having at least one polyester filament precoated with polyvinyl chloride.

7. A covering according to claim 1 wherein the woven polyvinyl chloride layer includes a core formed of a multifilament polyester coated with polyvinyl chloride.

8. A covering according to claim 1 wherein the woven polyvinyl chloride layer includes at least one core yarn coated with polyvinyl chloride.

9. A covering according to claim 1 wherein the woven polyvinyl chloride layer includes yarns having a monofilament core.

10. A covering according to claim 1 wherein the woven polyvinyl chloride layer includes yarns having a multifilament core.

11. A covering according to claim 1 wherein the woven polyvinyl chloride layer includes yarns coated with polyvinyl chloride, the yarns being selected from the group consisting of a polyester, nylon, wool, acrylic, cotton, modacrylic, polylactic acid.

12. A covering according to claim 1 wherein the covering is moisture-impermeable.

13. A floor or wall covering comprising:
    a non-woven polyester base layer;
    a first polyvinyl chloride layer overlying the base layer;
    a non woven mat overlying the first polyvinyl chloride layer;
    a second polyvinyl chloride layer overlying the mat; and
    a woven layer overlying the second polyvinyl chloride layer and forming a face layer for the covering, said woven layer including yarns having at least one polyester filament coated with polyvinyl chloride; and
    a pre-coat overlying and in contact with the base layer, said base layer including a non-woven polyester, said non-woven base layer and the pre-coat each having a weight of 4–40 oz/yd$^2$, said first and second polyvinyl chloride layers each having a weight of 10–80 oz/yd$^2$, said mat being formed of fiberglass.

14. A covering according to claim 13 wherein said non-woven base layer and the pre-coat have weights of 8–12 oz/yd$^2$ and about 24 oz/yd$^2$, respectively, said first and second polyvinyl chloride layers each having weights of about 45.5 oz/yd$^2$, said mat being formed of fiberglass.

* * * * *